United States Patent
Nozaki

(10) Patent No.: US 8,379,108 B2
(45) Date of Patent: Feb. 19, 2013

(54) ELECTRONIC CAMERA THAT DETECTS AND EXTRACTS FACES

(75) Inventor: Hirotake Nozaki, Port Washington, NY (US)

(73) Assignee: Nikon Corporation, Tokyo (JP)

( * ) Notice: Subject to any disclaimer, the term of this patent is extended or adjusted under 35 U.S.C. 154(b) by 140 days.

(21) Appl. No.: 12/225,824

(22) PCT Filed: Apr. 3, 2007

(86) PCT No.: PCT/JP2007/000362
§ 371 (c)(1),
(2), (4) Date: Nov. 26, 2008

(87) PCT Pub. No.: WO2007/113937
PCT Pub. Date: Oct. 11, 2007

(65) Prior Publication Data
US 2009/0167883 A1    Jul. 2, 2009

(30) Foreign Application Priority Data
Apr. 5, 2006  (JP) .................................. 2006-104047

(51) Int. Cl.
*H04N 5/76* (2006.01)
(52) U.S. Cl. .................................. 348/231.3; 348/231.6
(58) Field of Classification Search .. 348/231.99–231.3, 348/231.6; 382/115, 118
See application file for complete search history.

(56) References Cited

U.S. PATENT DOCUMENTS

| 2002/0111939 | A1* | 8/2002 | Kondo et al. ..................... 707/1 |
| 2002/0118285 | A1* | 8/2002 | Misawa et al. ........... 348/208.16 |
| 2005/0248681 | A1 | 11/2005 | Nozaki et al. |
| 2005/0280711 | A1 | 12/2005 | Ishii et al. |
| 2006/0034602 | A1 | 2/2006 | Fukui |
| 2006/0139461 | A1* | 6/2006 | Matsui et al. ............... 348/231.2 |

FOREIGN PATENT DOCUMENTS

| EP | 1 441 497 A2 | 7/2004 |
| EP | 1471455 A2 * | 10/2004 |
| JP | A-06-259534 | 9/1994 |

(Continued)

OTHER PUBLICATIONS

"Exchangeable image file format for digital still cameras: Exif Version 2.2." Apr. 2002. pp. 1-148. Japan Electronics and Information Technology Industries Association.

(Continued)

*Primary Examiner* — Daniel M Pasiewicz
(74) *Attorney, Agent, or Firm* — Oliff & Berridge, PLC

(57) ABSTRACT

An electronic camera including an imaging device photoelectrically converting a formed image of a subject to generate an image signal, a manipulation section accepting an input instructing a release, a face detecting section detecting a face area in a shooting image plane based on the image signal during a standby period for the release, a controlling section photographing the subject in response to the release to generate shooting image data from the image signal, a face recognizing data generating section which extracts a feature point of a person's face corresponding to the face area based on the image signal and generates face recognizing data of the photographed person based on the feature point when the release takes place while the face area is detected, and a recording section recording the face recognizing data.

7 Claims, 5 Drawing Sheets

FOREIGN PATENT DOCUMENTS

| | | |
|---|---|---|
| JP | A-2001-016573 | 1/2001 |
| JP | A-2005-208454 | 8/2005 |
| JP | 2005269563 A * | 9/2005 |
| JP | A-2005-323015 | 11/2005 |
| JP | A-2005-341017 | 12/2005 |
| JP | A-2006-074366 | 3/2006 |
| JP | A-2006-074498 | 3/2006 |
| JP | A-2006-087083 | 3/2006 |

OTHER PUBLICATIONS

Extended European Search Report issued in EP Application No. 07737019.5 on Nov. 15, 2010.

* cited by examiner

ELECTRONIC CAMERA THAT DETECTS AND EXTRACTS FACES

CROSS-REFERENCE TO RELATED APPLICATION

This application is a U.S. National Stage application claiming the benefit of prior filed International Application Number PCT/JP2007/000362, filed Apr. 3, 2007, in which the International Application claims a priority date of Apr. 5, 2006 based on prior filed Japanese Application Number 2006-104047, the entire contents of which are incorporated herein by reference.

TECHNICAL FIELD

The present invention relates to an electronic camera having a person's face recognizing function.

BACKGROUND ART

There have conventionally been disclosed techniques for extracting feature points of a face of a person from a shooting image of the photographed face of the person and recognizing the face based on to what degree face recognizing data regarding the person to be recognized agrees with the above feature points (see a patent document 1). Such face recognizing techniques require the advance registration of the face recognizing data in an electronic camera or the like. In particular, for improving accuracy of the face recognition, a larger number of face recognizing data are required, and therefore, it is necessary to generate the face recognizing data from a plurality of frames of shooting images.

If the abovementioned work of generating the face recognizing data in the camera is complicated, a generation amount and a generation frequency of the face recognizing data decrease, which may prevent full use of the face recognizing function. This has created a demand for a method enabling easier generation of the face recognizing data.

Patent document 1: Japanese Unexamined Patent Application Publication No. H 06-259534

DISCLOSURE

Problems to be Solved

The present invention is to solve the abovementioned problems of the related art and its proposition is to provide an electronic camera capable of easily generating face recognizing data.

Means for Solving the Problems

A first aspect of the present invention provides an electronic camera including an imaging device, a manipulation section, a face detecting section, a controlling section, a face recognizing data generating section, and a recording section. The imaging device photoelectrically converts a formed image of a subject to generate an image signal. The manipulation section accepts an input instructing a release. The face detecting section detects a face area in a shooting image plane based on the image signal during a standby period for the release. The controlling section photographs the subject in response to the release to generate shooting image data from the image signal. The face recognizing data generating section extracts a feature point of a person's face corresponding to the face area based on the image signal and generates face recognizing data of the photographed person based on the feature point when the release takes place while the face area is detected. The recording section records the face recognizing data.

In the first aspect, preferably, the face recognizing data generating section generates shooting condition data indicating a shooting condition under which the release takes place, and records the shooting condition data in correspondence to the face recognizing data.

In the first aspect, preferably, the face recognizing data generating section generates acquisition time data indicating an acquisition time of the face recognizing data and records the acquisition time data in correspondence to the face recognizing data.

In the first aspect, preferably, the face recognizing data generating section generates index image data indicating a face corresponding to the face recognizing data and records the index image data in correspondence to the face recognizing data.

In the first aspect, preferably, the electronic camera further includes a face recognizing section which determines whether or not the person in the face area is a registration person corresponding to the face recognizing data based on an output of the face detecting section and the face recognizing data.

In the first aspect, preferably, the face recognizing data generating section groups a plurality of the face recognizing data which are generated from a same person based on a result of the determination, and records the grouped face recognizing data.

In the first aspect, the recording section further records shooting number data indicating a number of shootings of each of the registration persons. Preferably, the face recognizing data generating section sets priorities to the registration persons based on the number of shootings. Further, preferably, the face recognizing data generating section deletes data regarding the registration person to whom the priority is set relatively low when the recording section lacks capacity.

A second aspect of the present invention provides an electronic camera including an imaging device, a manipulation section, a face detecting section, a controlling section, a face image generating section, and a recording section. The imaging device photoelectrically converts a formed image of a subject to generate an image signal. The manipulation section accepts an input instructing a release. The face detecting section detects a face area in a shooting image plane based on the image signal during a standby period for the release. The controlling section photographs the subject in response to the release to generate shooting image data from the image signal. The face image generating section cuts out an image in the face area to generate face image data when the release takes place while the face area is detected. The recording section records the face image data.

EFFECT

According to the electronic camera of the present invention, when the release takes place while the face area is detected, the face recognizing data of a photographed person as well as the shooting image data is generated.

DETAILED DESCRIPTION OF THE EMBODIMENTS

Figure 1:
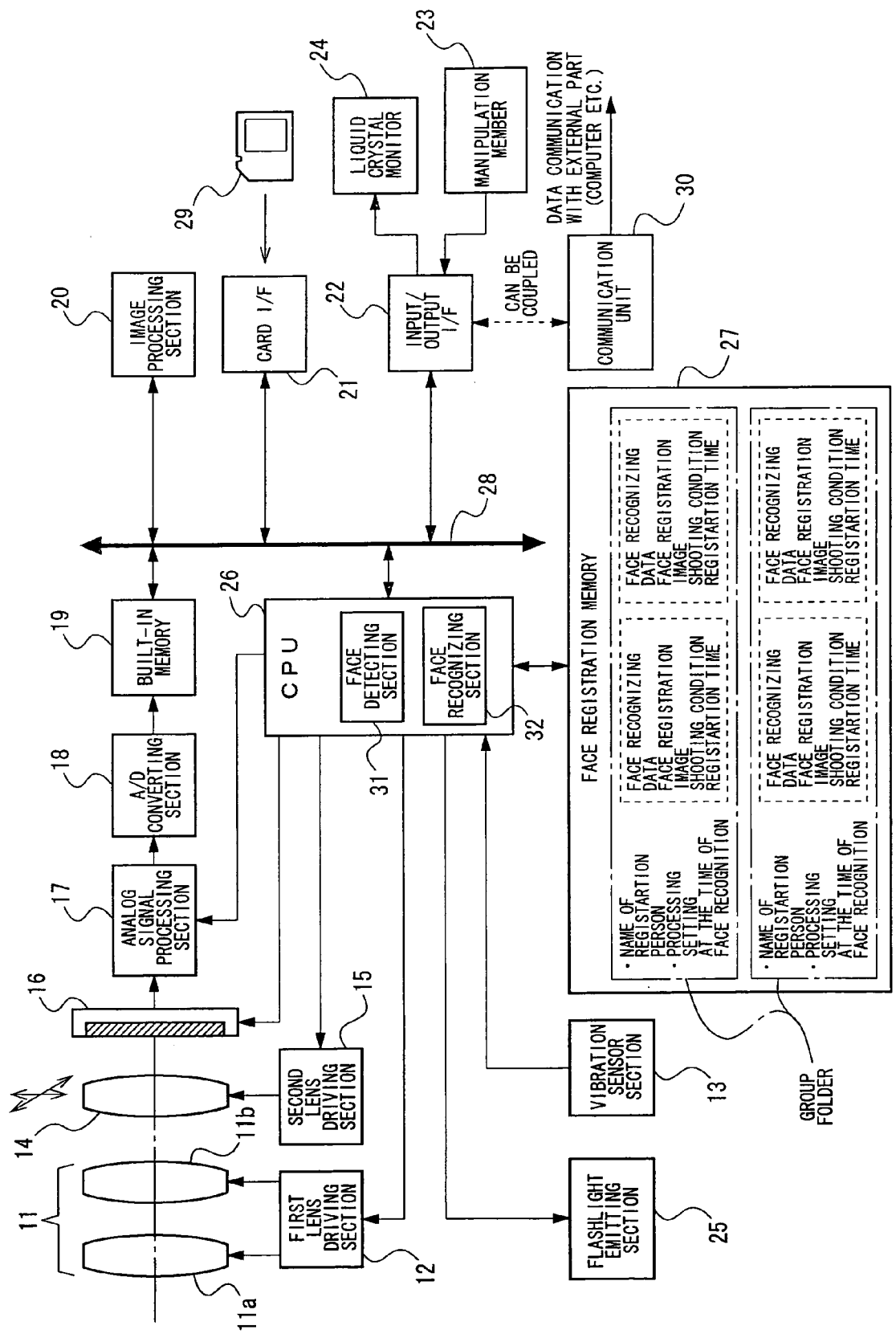
FIG. 1 is a block diagram showing the structure of an electronic camera of this embodiment.

FIG. 1 is a block diagram showing the structure of an electronic camera of this embodiment.

The electronic camera has an imaging optical system 11, a first lens driving section 12, a vibration sensor section 13, an image blur correcting lens 14, a second lens driving section 15, an imaging device 16, an analog signal processing section 17, an A/D converting section 18, a built-in memory 19, an image processing section 20, a card I/F 21, an input/output I/F 22, a manipulation member 23, a liquid crystal monitor 24, a flashlight emitting section 25, a CPU 26, a face registration memory 27, and a data bus 28. The built-in memory 19, the image processing section 20, the card I/F 21, the input/output I/F 22, and the CPU 26 are coupled to one another via the data bus 28.

The imaging optical system 11 is made up of a plurality of lens groups including a zoom lens 11a and a focusing lens 11b for focus position adjustment. The lenses included in the imaging optical system 11 are driven and adjusted in an optical axis direction by the first lens driving section 12.

The vibration sensor section 13 includes a vertical angular velocity sensor detecting a pitch motion of the electronic camera and a horizontal angular velocity sensor detecting a yaw motion of the electronic camera. The vibration sensor section 13 outputs, to the CPU 26, camera vibration data indicating the vibration of the electronic camera. The camera vibration data is used in computing a movement amount of the image blur correcting lens 14.

The image blur correcting lens 14 is capable of swinging in a direction perpendicular to the optical axis. The second lens driving section 15 includes a vertical swinging unit swinging the image blur correcting lens 14 in the vertical direction and a horizontal swinging unit swinging the image blur correcting lens 14 in the horizontal direction. For blur correction, the second lens driving section 15 swings the image blur correcting lens 14 based on the movement amount of the image blur correcting lens 14 computed by the CPU 26.

The imaging device 16 photoelectrically converts a luminous flux which has passed through the imaging optical system 11 to generate an analog image signal of a subject image. The imaging device 16 exposes the subject at predetermined intervals also during a non-release period (during a shooting standby period), and outputs an analog image signal (through image signal) by thinning-out reading. The through image signal is used for AF computation, AE computation, and a face detecting operation which will be described later, and the generation of a finder image, and so on.

The analog signal processing section 17 includes a CDS circuit for correlated double sampling, a gain circuit amplifying the analog image signal which is output, a clamp circuit clamping a waveform of an input signal to a fixed voltage level, and so on. The A/D converting section 18 converts the analog image signal of the imaging device 16 into a digital image signal. The built-in memory 19 temporarily stores data during a pre-process and a post-process of image processing by the image processing section 20. Incidentally, the built-in memory 19 may have a recording area in which later-described shooting image data can be recorded.

The image processing section 20 applies predetermined image processing to the digital image signal. The image processing section 20 generates the shooting image data based on an image signal generated when the release takes place. Further, the image processing section 20 sequentially generates through image data based on the through image signals. Resolution of the through image data is set lower than resolution of the shooting image data. The through image data is used in face recognition processing by the CPU 26 and is further used as a display image (preview image) of the liquid crystal monitor 24.

The image processing section 20 further executes compression processing and the like of the shooting image data. Still further, the image processing section 20 is capable of performing digital zoom processing in which part of a shooting image is cut out and its resolution is converted.

Further, the image processing section 20 generates video data in various kinds of displays (frame display at the time of face recognition and the like) according to an instruction from the CPU 26 and superimposes the video data on the through image data to output the resultant to the liquid crystal monitor 24. Consequently, the abovementioned various kinds of displays are synthesized on the preview image.

In the card I/F 21, a connector for coupling a recording medium 29 is formed. The recording medium 29 is formed by a generally-known semiconductor memory or the like. The card I/F 21 controls write/read of the shooting image data to/from the recording medium 29.

The manipulation member 23 and the liquid crystal monitor 24 are coupled to the input/output I/F 22. The manipulation member 23 includes an input button, a release button, and so on. The input button of the manipulation member 23 accepts, for example, an input for switching shooting modes (normal shooting mode, reproduction mode, face registration mode, face recognition shooting mode, and the like) of the electronic camera. The release button of the manipulation member 23 accepts an input instructing an AF operation when half-pressed, and accepts a release input when fully pressed.

In most cases, the liquid crystal monitor 24 is disposed on a rear surface portion of the electronic camera. This liquid crystal monitor 24 displays a reproduced image of the shooting image data, setting windows used for changing various kinds of settings of the electronic camera, and so on. The above setting windows include an edit window used for editing later-described face recognizing data. In the shooting mode, the liquid crystal monitor 24 is further capable of displaying the abovementioned preview image as a moving image. This enables a user to check the preview image on the liquid crystal monitor 24 along with the framing.

An external connection terminal is formed in the input/output I/F 22. The input/output I/F 22 controls data n a computer and the like coupled via the external connection terminal, based on a serial communication standard such as USB (Universal Serial Bus) or IEEE1394. A communication unit 30 which is an expansion device for enabling wireless communication with an external part can further be coupled to the external connection terminal of the input/output I/F 22.

The flashlight emitting section 25 includes a xenon arc tube, a main capacitor storing luminous energy, a reflector and a lens member for efficient emission of flashlight to a subject, a light emission controlling circuit regulating a timing and a light quantity of the light emission, and so on.

The CPU 26 controls operations of the sections of the electronic camera according to a sequence program stored in a not-shown ROM. For example, the CPU 26 executes generally-known contrast-type AF (auto-focus) computation, generally-known AE (auto-exposure) computation, and the like based on the through image signal. The CPU 26 further computes a movement amount of the image blur correcting lens 14 based on the abovementioned camera vibration data.

The CPU 26 further functions as a face detecting section 31 and a face recognizing section 32. The face detecting section 31 extracts feature points from the through image data or the shooting image data to detect a face area of a subject, the size of the face, and so on. For example, the face detecting section 31 extracts the face area by feature point extraction processing described in Japanese Unexamined Patent Application Publication No. 2001-16573 and so on. Examples of the feature points are end points of eye brows, eyes, nose, and lips, contour points of the face, a top point of the head, a lower end point of the chin, and the like.

In the face registration mode, the face recognizing section 32 generates the face recognizing data based on the feature points of the detected face. For example, the face recognizing section 32 generates the face recognizing data of a registration person based on positions of the feature points of the detected face, the sizes of parts of the face which are found from the feature points, relative distances of the feature points, and so on.

Further, in the face recognition shooting mode, the face recognizing section 32 executes face recognition processing to determine whether or not the face of a person in a shooting image plane is the face of the registration person corresponding to the face recognizing data. Concretely, the face recognizing section 32 first computes the positions of the feature points of the face of the photographed person, the sizes of the parts of the face, the relative distances of the feature points, and so on based on the feature points of the detected face. Next, the face recognizing section 32 compares the result of the above computation and the face recognizing data to find a degree of similarity between the face of the specific registration person and the face of the photographed person. Then, the face recognizing section 32 determines that the photographed person matches the specific registration person when the abovementioned degree of similarity exceeds a threshold value.

The CPU 26 is capable of executing changes in settings of a shooting condition or of the image processing, release instruction to the imaging device 16, and so on based on the result of the face recognition processing.

In the face registration memory 27, the face recognizing data generated by the face recognizing section 32 of the CPU 26 is recorded. In the face registration memory 27, group folders are generated for respective registration persons. In each of the group folders, the face recognizing data of each of the registration persons are recorded. That is, the face recognizing data in the face registration memory 27 are grouped into the group folder for each of the registration persons. For example, in the group folder, it is possible to record the plural face recognizing data which correspond to the same registration person but are different in the orientation of the face, the presence or absence of eye-glasses, the shooting condition, and so on. Then, when a registration person is designated, the CPU 26 is capable of reading all the face recognizing data in the group folder from the face registration memory 27.

In the face registration memory 27, data regarding names of the registration persons and data regarding processing settings at the time of the face recognition are recorded. The name of the registration person and the processing setting at the time of the face recognition are recorded in correspondence to the group folder of each of the registration persons.

Here, as the processing settings at the time of the face recognition, recorded are settings of various kinds of controls of the electronic camera which are employed when the registration person is recognized. For example, the processing settings at the time of the face recognition include (1) setting of the shooting condition at the shooting time, (2) setting of the image processing of the shooting image data, (3) setting of a recording destination of the shooting image data, (4) print designation setting of the shooting image data, and (5) transmission setting of the shooting image data, and so on.

The setting of the shooting condition in the above (1) includes an exposure correction value, setting of depth of field (selection of shallow or standard), and so on which are employed when each registration person is photographed. It is possible to further make such setting that the CPU 26 automatically shoots when the registration person is detected. The setting of the image processing in the above (2) includes setting whether or not soft focus processing of the shooting image data is applied, setting of suppressing edge enhancement, and so on.

As the setting of the recording destination in the above (3), a directory path of a recording folder in the recording medium 29 which is to be a recording destination of the shooting image data can be set for each registration person. That is, the CPU 26 is capable of recording the shooting image data of the respective registration persons in different recording folders by referring to the data in the face registration memory 27.

As the setting of the print designation in the above (4), it is possible to designate, for each of the registration persons, the presence or absence of the designation that the shooting image data should be printed according to a standard such as, for example, DPOF (Digital Print Order Format). As the transmission setting in the above (5), it is possible to designate whether or not the transmission of the shooting image data is necessary when the registration person is photographed and to designate address information (electronic mail address) of the transmission destination.

Further, in the face registration memory 27, recorded are face registration images, registration times of the face recognition data, and data of the shooting conditions at the time of the acquisition of the face recognizing data. The face registration images, the registration times of the face recognizing data, and the data of the shooting conditions at the time of the acquisition of the face recognizing data are recorded in correspondence to the respective face recognizing data in the group folder.

The abovementioned face registration image is shooting image data at the time of the acquisition of the face recognizing data and is resized to a predetermined pixel size. The liquid crystal monitor 24 displays the face registration image on the abovementioned edit window. That is, the face registration image functions as an index image for enhancing discriminatability and searchability of the registration person or the face recognizing data. For example, with the face registration image, a user can confirm, on the edit window, a person and a kind of its image (front face, profile, or the like) from which the face recognizing data was generated.

The registration time of the face recognizing data is data regarding the shooting date and time of face registration image data which is a source of the face recognizing data. Further, the shooting condition at the acquisition time of the face recognizing data is data regarding the shooting condition of the face registration image data. The above-mentioned shooting condition includes, for example, data of the focal distance of the imaging optical system 11, white balance and an exposure condition at the shooting time, the presence or absence of flashlight at the shooting time, and so on. The data such as the registration time of the face recognizing data and the shooting condition at the acquisition time of the face recognizing data are used for the determination when the CPU 26 narrows down the face recognizing data which is to be used in the face recognition processing.

In the face registration memory 27, further recorded are shooting number data each indicating the number of shootings for each registration person. The CPU 26 increments the number of shootings indicated by the shooting number data according to the result of the face recognition in the face recognition shooting mode. Incidentally, the above number of shootings may be manually input by a user on the edit window or the like.

Figure 2:
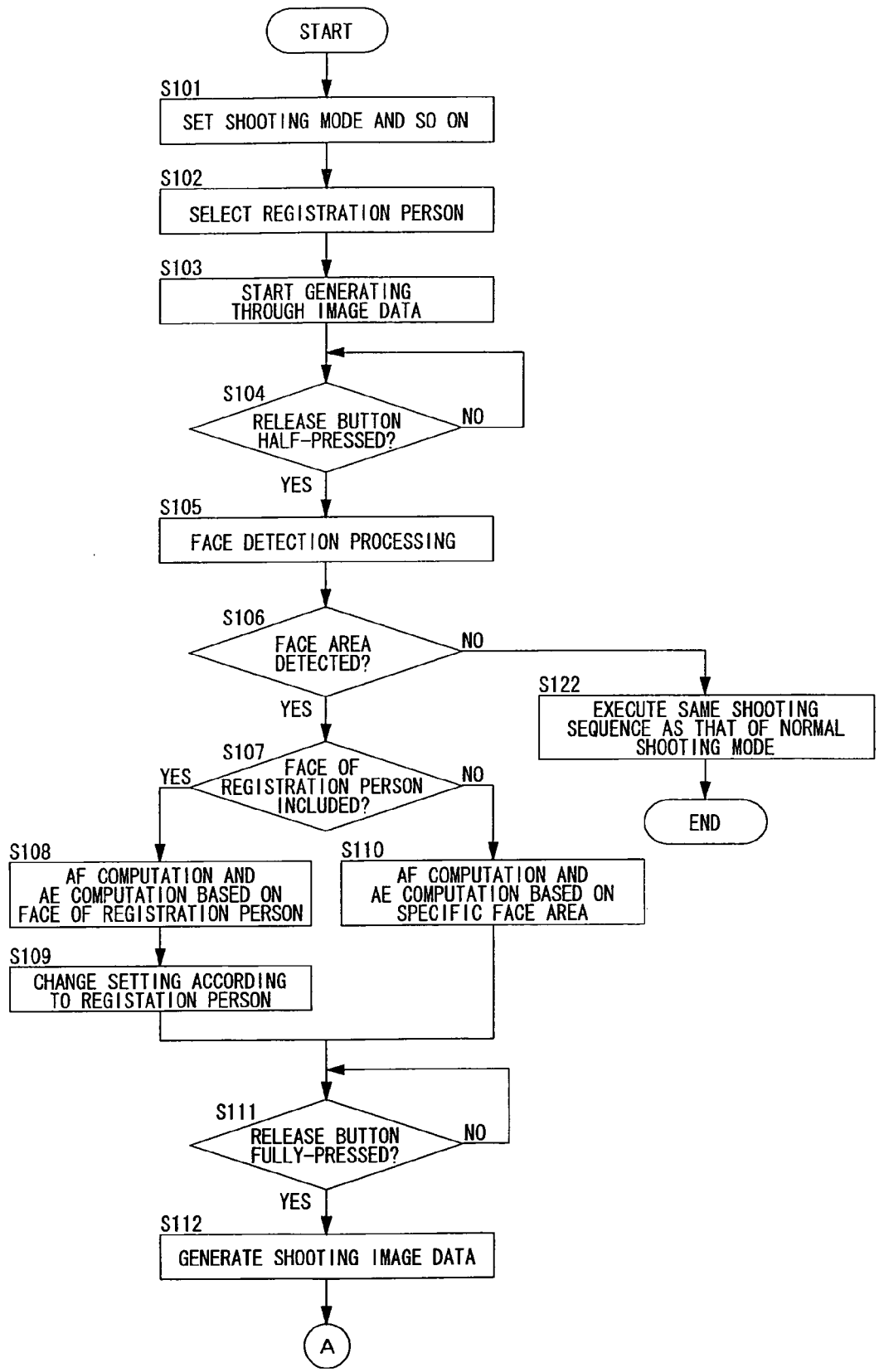
FIG. 2 is a flowchart showing a shooting operation of the electronic camera of this embodiment.
Figure 3:
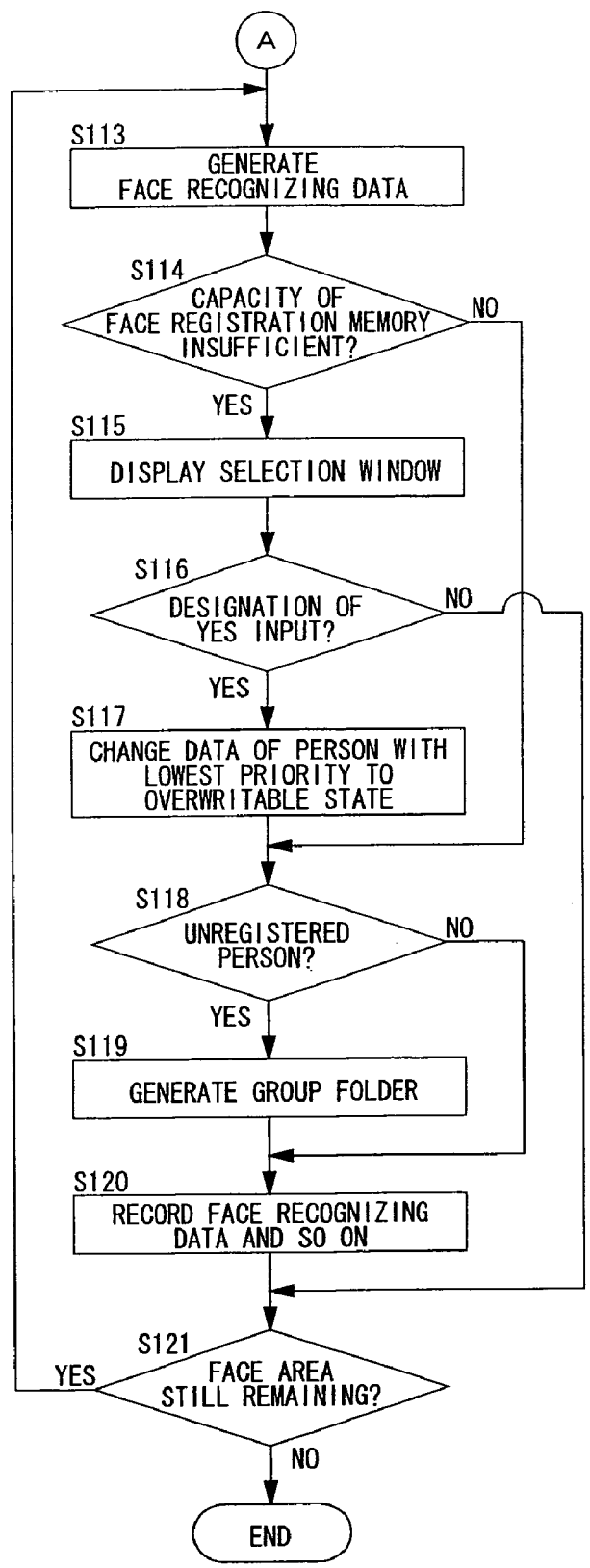
FIG. 3 is a flowchart showing the shooting operation of the electronic camera of this embodiment.

Hereinafter, an example of a shooting operation of the electronic camera of this embodiment will be described with reference to the flowcharts in FIG. 2 and FIG. 3.

Step 101: First, a user inputs the setting of the electronic camera to the CPU 26.

Figure 4:
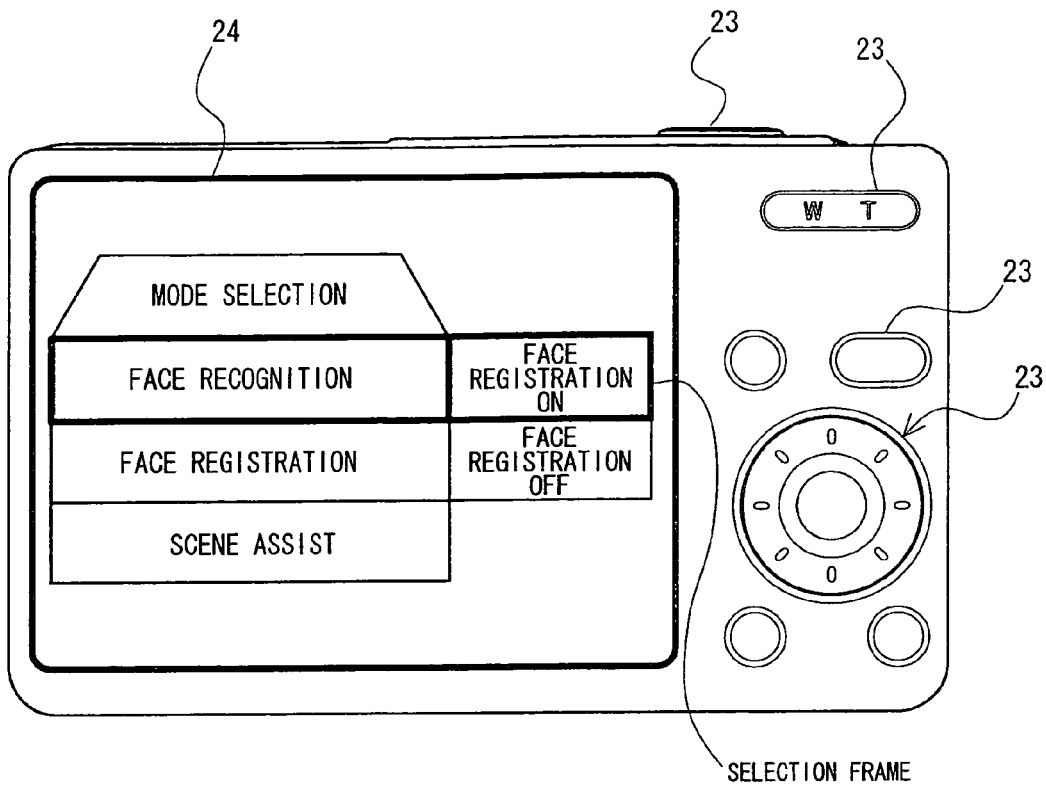
FIG. 4 is a view showing an example of a mode selection window.

For example, in a state where the electronic camera is set to a normal shooting mode or a portrait shooting mode, the user operates the manipulation member 23 to call a mode selection window. Accordingly, the CPU 26 displays the mode selection window (see FIG. 4) on the liquid crystal monitor 24.

Then, the user operates a selection frame on the mode selection window with the manipulation member 23 to instruct the CPU 26 to activate the face recognition shooting mode. Accordingly, the CPU 26 starts a series of operations of the face recognition shooting mode.

Further, on the abovementioned mode selection window, the user can select an item of face registration ON or face registration OFF in the selection frame to input the selected item to the CPU 26. When the designation of the face registration ON is input, the CPU 26 generates the shooting image data and the face recognizing data at the shooting time. When the designation of the face registration OFF is input, the CPU 26 generates only the shooting image data at the shooting time. Note that this embodiment will describe a case where the item of the face registration ON is input.

Figure 5:
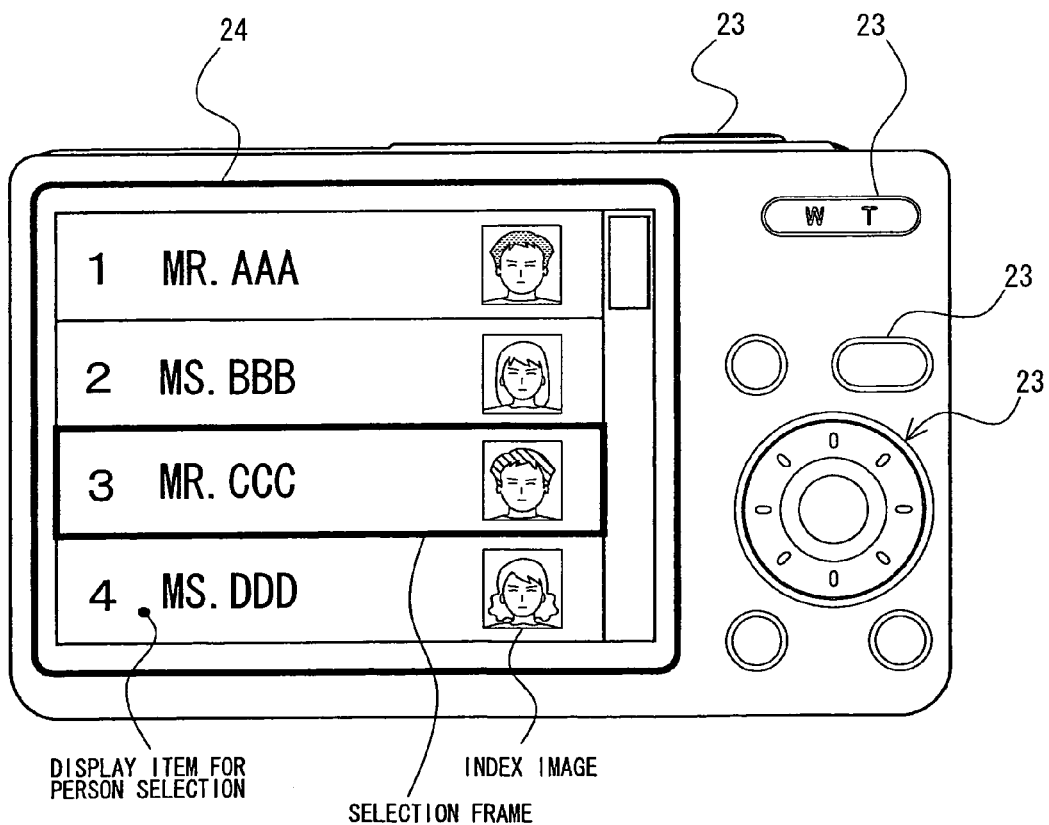
FIG. 5 is a view showing an example of a registration person selection window.

Step 102: The CPU 26 displays a registration person selection window (see FIG. 5) on the liquid crystal monitor 24. Then, the CPU 26 accepts a user's input designating a registration person who is a target of the face recognition (registration person whose face is to be recognized at the shooting time). Alternatively, the user can input the designation of the registration person who is a target of the face recognition, to the CPU 26 prior to the shooting.

Here, on the registration person selection window, the CPU 26 can accept the designation of one of or two or more of the registration persons. For example, the CPU 26 can further accept the designation of all the registration persons in the face registration memory 27. Further, if the group folders are linked in advance according to a predetermined category (for example, a family, a club, or the like), the user can input the designation of all the linked registration persons to the CPU 26 by inputting the designation of the category on the selection window.

Step 103: The CPU 26 drives the imaging device 16 to start acquiring the through image signal. The imaging device 16 outputs the through image signal by thinning-out reading at predetermined intervals. The image processing section 20 generates the through image data based on the through image signal. Then, on the liquid crystal monitor 24, the preview image is displayed as a moving image based on the through image data.

Step 104: The CPU 26 determines whether or not the release button has been half-pressed. When the release button has been half-pressed (YES side), the CPU 26 goes to S105. On the other hand, when the release button has not been half-pressed (NO side), the CPU 26 waits for the half-pressing operation of the release button.

Figure 6:
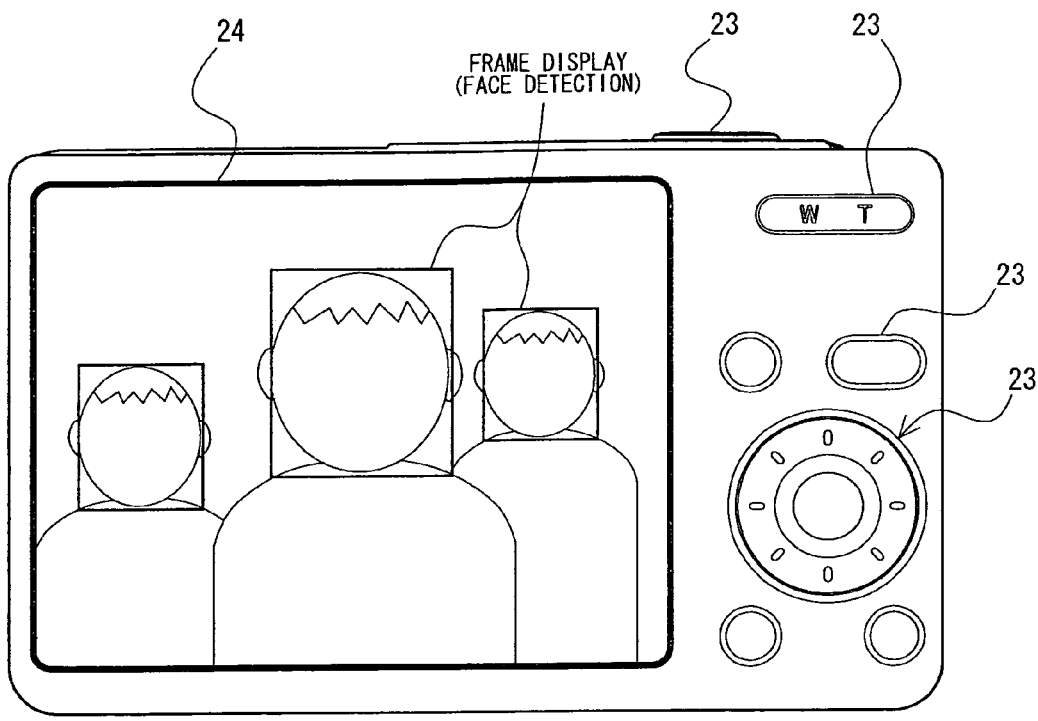
FIG. 6 is a view showing an example of a preview image displayed at the time of face detection.

Step 105: The face detecting section 31 of the CPU 26 applies face detection processing to the through image data to detect a face area in the shooting image plane. When the face detecting section 31 detects the face of a person in the shooting image plane, the image processing section 20 displays a rectangular frame in a synthesized manner on a position of the face area of the preview image (see FIG. 6). This enables the user to confirm, in the preview image, whether the face has been detected or not.

Step 106: The CPU 26 determines whether or not the face area has been detected at S105. When the face area has been detected (YES side), the CPU 26 goes to S107. On the other hand, when the face area has not been detected (NO side), the CPU 26 goes to S122.

Step 107: The face recognizing section 32 of the CPU 26 executes the face recognition processing to the detected face area (S105). Then, the face recognizing section 32 determines whether or not the face of the registration person (S102) is included. When the face of the registration person is included (YES side), the CPU 26 goes to S108. On the other hand, when the face of the registration person is not included (NO side), the CPU 26 goes to S110.

Step 108: The CPU 26 executes the AF computation and the AE computation, based on the position of the face of the registration person. Incidentally, when a plurality of the registration persons have been detected, the CPU 26 decides the priorities of the registration persons according to a predetermined algorithm and executes the above-mentioned computations based on the face of the registration person with the highest priority.

Step 109: The CPU 26 changes the setting of the shooting condition, the setting of the image processing, and so on of the electronic camera according to the detected registration person. Thereafter, the CPU 26 goes to S111. When auto-shooting of the registration person is set in the processing setting at the time of the face recognition, the CPU 26 goes to S112 to automatically photograph the registration person.

Here, the abovementioned setting change is made based on data regarding the processing setting at the time of the face recognition, which corresponds to the registration person. When a plurality of the registration persons have been detected, the CPU 26 selects data for the registration person with the highest priority as at S107 described above.

Step 110: The CPU 26 executes the AF computation and the AE computation, based on the position of the detected face area. Incidentally, when a plurality of face areas have been detected, the CPU 26 executes the abovementioned computations based on the face area positioned at the center of the shooting image plane or the closest face area.

Step 111: The CPU 26 determines whether or not the release button has been fully pressed. When the release button has been fully pressed (YES side), the CPU 26 goes to S112. On the other hand, when the release button has not been fully pressed (NO side), the CPU 26 waits for the full pressing operation of the release button.

Step 112: The CPU 26 shoots a subject image by driving the imaging device 16. Thereafter, the image processing section 20 generates the shooting image data based on the image signal generated at the time of the release. This shooting image data is finally recorded in the recording medium 29.

Here, when the face of the registration person is photographed, the image processing section 20 applies the image processing set at S109 to the shooting image data. Further, the CPU 26 increments the count of the shooting number data corresponding to the photographed registration person.

Step 113: In response to the release, the CPU 26 generates the face recognizing data of the face detected at S105. Here, when a plurality of face areas have been detected, the CPU 26 may generate the face recognizing data only from part of the face areas in the shooting image plane or may generate the face recognizing data from all the face areas.

When the plural face recognizing data are to be generated, the CPU 26 determines the face area which becomes the processing target, according to a predetermined algorithm to sequentially generate the face recognizing data. As an example of the algorithm for determining the processing target, the CPU 26 may generate the face recognizing data by giving the priority to the registration person. When a plurality of the registration persons have been photographed, the CPU 26 may generate the face recognizing data of the persons on a high-priority first basis.

Hereinafter, the process of generating the face recognizing data at S113 will be concretely described. Firstly, the CPU 26 instructs the image processing section 20 to generate the face registration image data. The image processing section 20 generates the whole image in the shooting image plane based on the image signal generated at the time of the release, and at the same time, cuts out a face portion from the whole image to generate the face registration image data. To generate the face registration image, the face area with the size of, for example, about 80×80 pixels is cut out from the whole image. It is preferable not to apply variable magnification processing by resolution conversion to an image of such face image data. Incidentally, image data corresponding to the whole image may be the abovementioned shooting image data or may be data in an intermediate process in the process of generating the shooting image data (for example, image data generated prior to compression processing or the like).

Secondly, the face detecting section 31 of the CPU 26 applies the feature point extraction processing to an image of each of the face registration image data to extract the feature points of the face corresponding to each of the face registration image data. Then, the face recognizing section 32 of the CPU 26 generates the face recognizing data based on the feature points of the face which are extracted from the face registration image data. Thereafter, the image processing section 20 resizes a face image of the face registration image data to a predetermined size by the resolution conversion to generate the index image data.

Step 114: The CPU 26 determines whether or not the face registration memory lacks the recording capacity (that is, whether or not the currently processed face recognizing data is recordable in the face registration memory). When the recording capacity is insufficient (YES side), the CPU 26 goes to S115. On the other hand, when the recording capacity is large enough (NO side), the CPU 26 goes to S118.

Step 115: The CPU 26 displays, on the liquid crystal monitor 24, a selection window regarding the recording of the currently processed face recognizing data. This selection window gives a display asking the user to input whether to record the currently processed face recognizing data or not.

Figure 7:
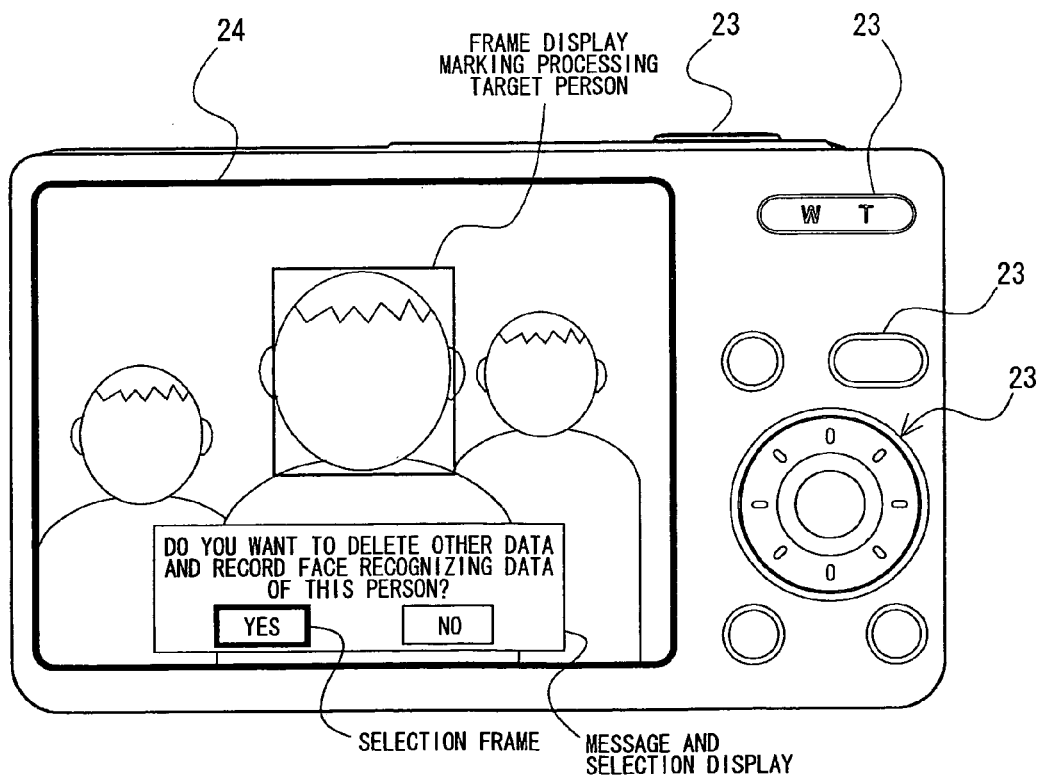
FIG. 7 is a view showing an example of a selection window at the time of the generation of face recognition data.

FIG. 7 shows an example of the abovementioned selection display. Display processing and operation on the selection window are executed by the CPU 26 based on a sequence program. The selection window in FIG. 7 gives a display marking a person who is a current processing target, a message such as "Do you want to delete the other data and record the face recognizing data of this person?", and selection displays (YES, NO) as a response to this message. In FIG. 7, as the display marking the person who is the processing target, a rectangular frame is displayed in a superimposed manner on the face area of the processing target in the whole image. Incidentally, a face image of the person who is the processing target may be displayed (not shown).

Then, when the user inputs the designation of one of the abovementioned selection displays in the selection frame by using the manipulation member 23, the selection result is input to the CPU 26.

Step 116: The CPU 26 determines whether or not the designation of the selection display YES has been input on the selection window displayed at S115. When the designation of YES has been input (YES side), the CPU 26 goes to S117. When the designation of NO has been input (NO side), the CPU 26 goes to S121. In this case, the currently processed face area is thereafter handled in the same manner as the processed face area.

Step 117: The CPU 26 changes data of the registration person whose priority is set the lowest in a data group in the face registration memory 27 to an overwritable state. Consequently, the capacity for recording the currently processed face recognizing data and so on is reserved on the face registration memory 27.

Here, the CPU 26 may delete all the face recognizing data and so on of a specific registration person. Alternatively, the CPU 26 may sequentially delete only data with relatively low importance among the face recognizing data of a specific registration person (for example, the face recognizing data with the least number of the extracted feature points, the face recognizing data whose shooting date and time is the oldest, or the like).

Step 118: The CPU 26 determines whether or not the face area as the processing target is that of an unregistered person, based on the determination result at S107. When the face area is that of an unregistered person (YES side), the CPU 26 goes to S119. On the other hand, the face area is that of a registered person (NO side), the CPU 26 goes to S120.

Step 119: The CPU 26 generates a new group folder in the face registration memory 27 in order to record the currently processed face recognizing data. Further, the CPU 26 increments the count of the shooting number data corresponding to the new group folder and, at this stage, counts the number of shootings of the unregistered person.

Step 120: The CPU 26 records the currently processed face recognizing data and its relevant data in the group folder, in the face registration memory 27, corresponding to the photographed person. Here, the relevant data of the face recognizing data includes the abovementioned index image data, data of the shooting condition at the time of the release, and shooting date and time data indicating the registration time of the face recognizing data. Each of the relevant data is recorded by the CPU 26 in correspondence to the face recognizing data.

Step 121: The CPU 26 determines whether or not there still remains a face area for which the face recognizing data is to be generated. When there still remains a face area for which the face recognizing data is to be generated (YES side), the CPU 26 decides a face area which is to be a processing target next and returns to S113 to repeat the above-described operations. On the other hand, when there is no more face area for which the face recognizing data is to be generated (NO side), the CPU 26 finishes the shooting operation for one frame to shift to a shooting standby state. Incidentally, the CPU 26 may return to S104 to continue the shooting in response to a user's operation.

Step 122: In this case, the CPU 26 executes the AF computation and the AE computation based on the same algorithm as that used in the normal shooting mode where no face detection is performed. Then, the CPU 26 photographs a subject in response to the full-pressing of the release button. Thereafter, the image processing section 20 generates the shooting image data based on the image signal at the time of the release. Needless to say, in this case, the face recognizing data is not generated.

Hereinafter, the operation and effect of the face recognition shooting mode of this embodiment will be described. In the face recognition shooting mode described above, the electronic camera generates the shooting image data and the face recognizing data at the same time in response to the release (S112, S113). Therefore, the face recognizing data is generated at the shooting time such as when a normal snapshot is taken, even if the user does not intentionally perform the shooting only for the face registration. Therefore, the work of registering the face recognizing data in the face registration memory 27 becomes very easy.

Further, in the above-described face recognition shooting mode, the electronic camera performs the face recognition of the photographed person based on the face recognizing data (S107). Then, when the face as the recognition target is detected, various kinds of processing and so on at the shooting time are performed under the setting corresponding to the registration person (S108, S109, S112). Therefore, since at the shooting time of the registration person, the electronic camera automatically performs the processing in which a user's intention is reflected, convenience of the user operating the electronic camera is remarkably improved.

(Supplementary Items of Embodiment)

Hitherto, the present invention has been described by the above-described embodiment, but the technical scope of the present invention is not limited to the above-described embodiment and the present invention may be in the following forms, for instance.

(1) The above embodiment describes the example where the electronic camera generates the face recognizing data at the shooting time. However, the CPU 26 may only record the face registration image data at the shooting time, and after the shooting, the face recognizing data may be generated from the face registration image data by post-processing by a computer.

In the above case, the CPU 26 may record the index image data, the shooting condition, the shooting date and time, and the like in correspondence to the face image data. Further, as for the face image data, it is preferable that the CPU groups the plural face image data generated from the same photographed person into the same folder or the like when recording them.

(2) In the above-described embodiment, the CPU 26 may generate the face recognizing data in response to the release based on the feature points extracted by the face detection prior to the release, without generating the face registration image data.

(3) In the above-described embodiment, the CPU 26 may display, on the liquid crystal monitor 24, a display marking a person who is a current processing target when generating the face recognizing data. Further, when creating the face recognizing data, the CPU 26 may display a selection display asking a user whether the face recognizing data of the processing target person is necessary or not, on the liquid crystal monitor 24 every time.

(4) In the above-described embodiment, when the face registration memory lacks the recording capacity, the CPU 26 may stop the generation of the face recognizing data and at the same time display NG on the liquid crystal monitor 24.

(5) The above embodiment describes the example where the electronic camera executes the face detection processing and the face recognition processing prior to the shooting. However, the present invention is similarly applicable in a shooting mode where the face detection processing is performed but the face recognition processing is not performed prior to the shooting.

(6) It suffices that the data of the registration time in the above-described embodiment indicates the rough time when the source face image is shot. Therefore, the CPU may record only up to one of the shooting year, shooting month, and shooting date as the registration time, and may omit the recording of the detailed hour or the like.

(7) In the face recognition processing in the above-described embodiment, the face recognizing section 32 may narrow down the face recognizing data which is to be used for the determination, from the grouped face recognizing data according to a predetermined condition. For example, the face recognizing section 32 may exclude the face recognizing data which is a predetermined time older or more than the shooting date and time, based on the registration time of the face recognizing data. Similarly, based on the shooting condition when the face recognizing data is acquired, the face recognizing section 32 may exclude the face recognizing data generated under a shooting condition which is greatly different from the current shooting condition.

(8) The electronic camera of the present invention need not have the same structure as the structure of the electronic camera of the embodiment. For example, the built-in memory 19 and the face registration memory 27 may be formed as a common memory. The face registration memory 27 may be coupled to the CPU 26 via the data bus 28. Further, the optical blur correcting mechanism made up of the vibration sensor section 13, the image blur correcting lens 14, and the second lens driving section 15 may be omitted. Further, the communication unit 30 may be mounted in the electronic camera.

(9) In the recording medium 29, the CPU 26 may record the data which are in the face registration memory 27, thereby enabling the backup of the face registration memory 27. Further, the CPU 26 may acquire, from the recording medium 29, the face recognizing data and so on generated by another electronic camera in advance so that the data in the face registration memory 27 can be shared by the electronic cameras.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An electronic camera comprising:
   an imaging device photoelectrically converting a formed image of a subject to generate an image signal;
   a manipulation section accepting an input instructing a release;
   a face detecting section detecting a face area in a shooting image plane based on the image signal during a standby period for the release;

a controlling section photographing the subject in response to the release to generate a shooting image from the image signal;

a face recognizing data generating section which generates a face registration image by cutting out a portion corresponding to the face area from the shooting image at the time of the release, extracts a feature point of a person's face from the face registration image and generates face recognizing data to be used for a face recognition process of a subsequent photographing, while the face area is being detected; and a recording section recording the face recognizing data and index image data indicating a face corresponding to the face recognizing data in correspondence to the face recognizing data; and a display section displaying an image plane which includes a display of a plurality of index images associated with the face recognizing data and allows for specifying a target of face recognition by using the index images when accepting an input specifying the target of face recognition before performing a face recognition process.

2. The electronic camera according to claim 1, wherein the face recognizing data generating section generates shooting condition data indicating a shooting condition under which the release takes place, and records the shooting condition data in correspondence to the face recognizing data.

3. The electronic camera according to claim 1, wherein the face recognizing data generating section generates acquisition time data indicating an acquisition time of the face recognizing data and records the acquisition time data in correspondence to the face recognizing data.

4. The electronic camera according to claim 1, further comprising a face recognizing section which determines whether or not the person in the face area is a registration person corresponding to the face recognizing data based on an output of the face detecting section and the face recognizing data.

5. The electronic camera according to claim 4, wherein the face recognizing data generating section groups a plurality of the face recognizing data which are generated from a same person based on a result of the determination and records the grouped face recognizing data.

6. The electronic camera according to claim 4, wherein:

the recording section further records shooting number data indicating a number of shootings of each of the registration persons; and the face recognizing data generating section sets priorities to the registration persons based on the number of shootings.

7. The electronic camera according to claim 6, wherein the face recognizing data generating section deletes data regarding the registration person to whom the priority is set relatively low when the recording section lacks capacity.

* * * * *